United States Patent
Nishimura

(10) Patent No.: US 7,688,844 B2
(45) Date of Patent: Mar. 30, 2010

(54) COMPETITION AVOIDANCE CONTROL METHOD FOR DATA TRANSMISSION-RECEPTION SYSTEM, DATA TRANSMISSION-RECEPTION SYSTEM, AND TERMINAL FOR DATA TRANSMISSION-RECEPTION SYSTEM

(75) Inventor: Yasunori Nishimura, Tokyo (JP)

(73) Assignee: NEC Corporation, Tokyo (JP)

( * ) Notice: Subject to any disclaimer, the term of this patent is extended or adjusted under 35 U.S.C. 154(b) by 1496 days.

(21) Appl. No.: 11/019,158

(22) Filed: Dec. 23, 2004

(65) Prior Publication Data

US 2005/0141543 A1 Jun. 30, 2005

(30) Foreign Application Priority Data

Dec. 26, 2003 (JP) .............................. 2003-435359

(51) Int. Cl.
*H04B 7/212* (2006.01)
(52) U.S. Cl. ........................................ 370/443; 370/338
(58) Field of Classification Search ................. 370/338, 370/311, 443, 444, 400, 332, 328–329, 447–448; 455/13.4, 522, 571–574, 127.1, 127.5, 343.1, 455/343.4, 63.1, 67.13
See application file for complete search history.

(56) References Cited

U.S. PATENT DOCUMENTS

| | | | |
|---|---|---|---|
| 7,233,603 B2* | 6/2007 | Lee | 370/445 |
| 7,369,518 B2* | 5/2008 | Lee | 370/311 |
| 2001/0031626 A1* | 10/2001 | Lindskog et al. | 455/67.3 |
| 2003/0012167 A1* | 1/2003 | Benveniste | 370/338 |
| 2004/0190467 A1* | 9/2004 | Liu et al. | 370/311 |
| 2006/0171362 A1* | 8/2006 | Garg et al. | 370/338 |

FOREIGN PATENT DOCUMENTS

| | | |
|---|---|---|
| CN | 1361637 A | 7/2002 |
| EP | 0 064 818 A | 11/1982 |
| JP | HEI 08-195754 | 7/1996 |
| JP | 2002-247042 A | 8/2002 |
| JP | 2003-348095 A | 12/2003 |

OTHER PUBLICATIONS

Brian et al, IEEE 802.11 Wireless Local area Networks, 1997.*
IEEE Standard Part 11: wireless LAN medium access control (MAC) and physical layer (PHY) specifications, ISO/IEC 8802-11, 1999 edition, pp. 123-137.
Shin Hitotsumatsu, et al.; "New Encyclopedia of Mathematics (Shin Sugaku-Jiten)"; Osaka Shoseki Co., Ltd.; Mar. 30, 1998; pp. 633-636.

* cited by examiner

*Primary Examiner*—Aung S Moe
*Assistant Examiner*—Vinncelas Louis
(74) *Attorney, Agent, or Firm*—Dickstein, Shapiro, LLP.

(57) ABSTRACT

A competition avoidance control method for a data transmission-reception system, a data transmission-reception system and a terminal for a data transmission-reception system for reducing electricity consumption by the terminal in wait state to send a PS-POLL. Each terminal sends a PS-POLL to an access point after a designated time has passed. Therefore, the terminals hardly send the PS-POLLs simultaneously to the access point. Thus, the terminals can avoid wasteful standby state, thus consuming lower amount of electricity while waiting to send PS-POLL.

7 Claims, 8 Drawing Sheets

US 7,688,844 B2

COMPETITION AVOIDANCE CONTROL METHOD FOR DATA TRANSMISSION-RECEPTION SYSTEM, DATA TRANSMISSION-RECEPTION SYSTEM, AND TERMINAL FOR DATA TRANSMISSION-RECEPTION SYSTEM

BACKGROUND OF THE INVENTION

1. Field of the Invention

The present invention relates to a competition avoidance control method for a data transmission-reception system in which a base station and a plurality of terminals are connected to prevent competition for priority over data reception among the terminals during the period from when the respective terminals receive an indication signal simultaneously until they receive an indication signal, a data transmission-reception system, and a terminal for a data transmission-reception system.

2. Description of the Prior Art

FIG. 1 is a sequence diagram to explain a conventional method for controlling a wireless LAN as a data transmission-reception system.

FIG. 1 shows an example of data reception sequence in stations or terminals (hereinafter referred to as STA) in the power save (hereinafter referred to as PS) mode of the infrastructure of a wireless LAN in which an access point (hereinafter referred to as AP) as a base station and a plurality of terminals are wirelessly connected.

In FIG. 1, the shaded portions of each of the STAs 1 and 2 show electricity consumption.

The AP cyclically sends an annunciation signal called Beacon to all the STAs. The beacon contains information about the presence or absence of data to each STA.

In FIG. 1, each STA consumes electricity to receive the beacons. The STA 1 learns that there is data to the STA 1 by the second beacon and sends a packet called PS-POLL to the AP. Having received the PS-POLL, the AP recognizes that the STA 1 is ready for data reception, thus sending data to the STA 1. After receiving this data, the STA 1 sends an acknowledgement packet ACK to the AP. The STA 1 consumes electricity in sending the PS-POLL, receiving the data, and sending the ACK.

The operation of the conventional data transmission-reception system for a plurality of STAs will be described referring to FIG. 2.

FIG. 2 is a sequence diagram to explain the conventional method for controlling a wireless LAN for a plurality of terminals.

When both the STA 1 and STA 2 have data to be received, each STA tries to send its PS-POLL to the AP after receiving a beacon. The STA which failed to acquire a priority to send the PS-POLL (STA 2 in FIG. 2) is in the wait state (standby mode) until the STA 1 finishes receiving the data. Because it is unclear when the STA 1 finishes receiving the data, the STA 2 always monitors electric wave condition and also is ready for transmission, and therefore consumes electricity all the while.

The case that there is data for one STA is shown in FIG. 1.

On receipt of a beacon indicating that the AP has data for the STA 1, the STAL sends a PS-POLL to the AP just after finishing beacon receiving process. The AP learns by receiving the PS-POLL that the STA 1 is ready for reception, and sends the data to the STA 1 in response to the PS-POLL.

The case that there are data for a plurality of STAs is shown in FIG. 2. On receipt of beacons indicating that the AP has data for both the STA 1 and STA 2, the respective STAs try to send a PS-POLL just after having received a beacon as in the case of FIG. 1.

However, to avoid radio collision, these two STAs are given priority on a first-come basis (competition).

In the following, a description will be given of the competition.

Normally, for power saving, the STAs switch to receiving mode at beacon intervals, and otherwise turn off the transmission-reception circuit to enter the mode consuming as little electricity as possible. In other words, when the AP simply sends data to the STA, the STA cannot receive the data because the reception circuit is off. Therefore, the AP sends a beacon to the STA and waits for a response, PS-POLL. When the AP has data to send to some STAs (the same or different data may be sent to the respective STAs), the AP sends the data to the STAs in order of receipt of their PS-POLLs. Incidentally, the STA arbitrarily sends data to the AP. The AP is always ready to send and receive data, and therefore, is capable of sending data immediately if the radio wave is available.

When sending a PS-POLL, the STA monitors the radio wave condition. If the radio wave is available, the STA sends the PS-POLL. Thus, the respective STAs send a PS-POLL on a first-come basis.

In FIG. 2, the STA 1 won the priority competition. Having failed to acquire the priority, the STA 2 waits for the STA 1 to finish data receiving process while monitoring the radio condition because the time which it takes for the STA 1 to complete the process is unclear. The STA 2 sends a PS-POLL to the AP immediately after the STA 1 has finished data receiving process to receive data. The STAs waste electricity after failing to acquire the priority until sending the PS-POLL.

Consequently, for example, the Japanese Patent Application Laid-Open No. HEI 8-195754 has proposed a radio communication device intended to reduce electricity consumption.

However, according to the conventional technique mentioned above, because the standby time of a mobile station is set longer every time the beacon signal is received, there is a high possibility that an interrupt from another mobile station occurs during the standby time. On the other hand, because standby time is set short while the beacon signal is not received, there is a possibility that the mobile station wastefully consumes electricity. In addition, because the timer operation is stopped when the standby time is shorter than a designated length, there is also a possibility that the mobile station wastefully consumes electricity.

SUMMARY OF THE INVENTION

It is therefore an object of the present invention to provide a competition avoidance control method for a data transmission-reception system, which can reduce electricity consumption in waiting state before sending a PS-POLL, a data transmission-reception system, and a terminal for a data transmission-reception system.

To overcome the problems mentioned above, according to the first aspect of the present invention, there is provided a competition avoidance control method for a data transmission-reception system comprising a base station and a plurality of terminals connected to the base station, respectively, the method preventing competition for priority over data reception among the terminals during the period from when the respective terminals receive an indication signal simultaneously from the base station until the terminals receive the next indication signal, wherein each terminal sends a request signal to the base station to receive data therefrom after a designated time has passed from when the terminal received an indication signal.

In the first aspect of the present invention, each terminal sends the request signal to the base station after a designated time has passed. Consequently, the terminals hardly send the request signals simultaneously, and do not wastefully standby. Therefore, electricity consumption in standby state before sending the request signal is reduced. Incidentally, standby state means the minimum required state for the terminal to reboot without monitoring radio wave conditions or preparing for transmission, it may be likened to catnap state.

According to the second aspect of the present invention, in the first aspect, each terminal sends the request signal to the base station after a different random time has passed from when the terminal received an indication signal.

According to the third aspect of the present invention, in the first or second aspect, the random time is produced based on a random number no less than 0 and less than 1 or based on a pseudo-random number no less than 0 and less than 1.

According to the fourth aspect of the present invention, in the third aspect, the initial value of the random number is based on the proper number of each terminal.

According to the fifth aspect of the present invention, in the third or fourth aspect, the random number is an algebraic function or a transcendental function whose range is from no less than 0 to less than 1.

According to the sixth aspect of the present invention, in one of the second to fifth aspects, the random time is represented by expression (1):

$$\text{Wait} = Tb * RND() \tag{1}$$

where Wait indicates a period of time from when a terminal finishes the receiving process of the indication signal until the terminal sends the request signal, Tb indicates indication signal interval, and RND( ) indicates a function for producing the random number no less than 0 and less than 1.

According to the seventh aspect of the present invention, in one of the second to fifth aspects, the random time is represented by expression (2):

$$\text{Wait} = (Tb - Tb2) * RND() \tag{2}$$

where Wait indicates a period of time from when a terminal finishes the receiving process of the indication signal until the terminal sends the request signal, Tb indicates indication signal interval, Tb2 indicates a period of time from when the terminal starts the receiving process of the indication signal until the terminal finishes the process, and RND( ) indicates a function for producing the random number no less than 0 and less than 1.

According to the eighth aspect of the present invention, in one of the second to fifth aspects, the random time is represented by expression (3):

$$\text{Wait} = (Tb - Tb2) * RND() - Td \tag{3}$$

where Wait indicates a period of time from when a terminal finishes the receiving process of the indication signal until the terminal sends the request signal, Tb indicates indication signal interval, Tb2 indicates a period of time from when the terminal starts the receiving process of the indication signal until the terminal finishes the process, Td indicates the time which it takes for the terminal to receive data from the base station, and RND( ) indicates a function for producing the random number no less than 0 and less than 1.

According to the ninth aspect of the present invention, in one of the second to fifth aspects, the random time is represented by expression (4):

$$\text{Wait} = (Tb - Tb2 - Td2) * RND() + Td2 - Td \tag{4}$$

where Wait indicates a period of time from when a terminal finishes the receiving process of the indication signal until the terminal sends the request signal, Tb indicates indication signal interval, Tb2 indicates a period of time from when the terminal starts the receiving process of the indication signal until the terminal finishes the process, Td indicates the time which it takes for the terminal to receive data from the base station, Td2 indicates the predicted time which it takes for another terminal which has acquired a priority to receive data, and RND( ) indicates a function for producing the random number no less than 0 and less than 1.

According to the tenth aspect of the present invention, in one of the first to ninth aspects, when the base station transmits the next indication signal to a terminal while the terminal is receiving data from the base station, the terminal gives priority to the reception of the data, and the base station ignores request signals from other terminals.

According to the eleventh aspect of the present invention, there is provided a data transmission-reception system comprising a base station and a plurality of terminals connected to the base station, respectively, wherein each of the terminals receives data from the base station when having acquired a priority from the base station during the period from when the respective terminals receive an indication signal simultaneously until the terminals receive the next indication signal, and waits in standby mode when having failed to acquire a priority. Each terminal sends a request signal to the base station to receive data therefrom after a designated time has passed from when the terminal received an indication signal.

According to the twelfth aspect of the present invention, in the eleventh aspect, each terminal sends the request signal to the base station after a different random time has passed from when the terminal received an indication signal.

According to the thirteenth aspect of the present invention, in the eleventh or twelfth aspect, the random time is produced based on a random number no less than 0 and less than 1 or based on a pseudo-random number no less than 0 and less than 1.

According to the fourteenth aspect of the present invention, in the thirteenth aspect, the initial value of the random number is based on the proper number of each terminal.

According to the fifteenth aspect of the present invention, in the thirteenth or fourteenth aspect, the random number is an algebraic function or a transcendental function whose range is from no less than 0 to less than 1.

According to the sixteenth aspect of the present invention, in one of the twelfth to fifteenth aspects, the random time is represented by expression (1):

$$\text{Wait} = Tb * RND()$$

where Wait indicates a period of time from when a terminal finishes the receiving process of the indication signal until the terminal sends the request signal, Tb indicates indication signal interval, and RND( ) indicates a function for producing the random number no less than 0 and less than 1.

According to the seventeenth aspect of the present invention, in one of the twelfth to fifteenth aspects, the random time is represented by expression (2):

$$\text{Wait} = (Tb - Tb2) * RND() \tag{2}$$

where Wait indicates a period of time from when a terminal finishes the receiving process of the indication signal until the terminal sends the request signal, Tb indicates indication signal interval, Tb2 indicates a period of time from when the terminal starts the receiving process of the indication signal until the terminal finishes the process, and RND( ) indicates a function for producing the random number no less than 0 and less than 1.

According to the eighteenth aspect of the present invention, in one of the twelfth to fifteenth aspects, the random time is represented by expression (3):

$$\text{Wait}=(Tb-Tb2)*RND(\,)-Td \qquad (3)$$

where Wait indicates a period of time from when a terminal finishes the receiving process of the indication signal until the terminal sends the request signal, Tb indicates indication signal interval, Tb2 indicates a period of time from when the terminal starts the receiving process of the indication signal until the terminal finishes the process, Td indicates the time which it takes for the terminal to receive data from the base station, and RND( ) indicates a function for producing the random number no less than 0 and less than 1.

According to the nineteenth aspect of the present invention, in one of the twelfth to fifteenth aspects of present invention, the random time is represented by expression (4):

$$\text{Wait}=(Tb-Tb2-Td2)*RND(\,)+Td2-Td \qquad (4)$$

where Wait indicates a period of time from when a terminal finishes the receiving process of the indication signal until the terminal sends the request signal, Tb indicates indication signal interval, Tb2 indicates a period of time from when the terminal starts the receiving process of the indication signal until the terminal finishes the process, Td indicates the time which it takes for the terminal to receive data from the base station, Td2 indicates the predicted time which it takes for another terminal which has acquired a priority to receive data, and RND( ) indicates a function for producing the random number no less than 0 and less than 1.

According to the twentieth aspect of the present invention, there is provided a terminal for a data transmission-reception system comprising a base station and a plurality of terminals connected to the base station, respectively, the terminal receiving data from the base station when having acquired a priority from the base station, and waiting in standby mode when having failed to acquire a priority during the period from when the respective terminals receive an indication signal simultaneously until the terminals receive the next indication signal. Each terminal sends a request signal to the base station to receive data therefrom after a designated time has passed from when the terminal received an indication signal.

According to the twenty-first aspect of the present invention, in the twentieth aspect, each terminal sends the request signal to the base station after a different random time has passed from when the terminal received an indication signal.

According to the twenty-second aspect of the present invention, in the twentieth or twenty-first aspect, the random time is produced based on a random number no less than 0 and less than 1 or based on a pseudo-random number no less than 0 and less than 1.

According to the twenty-third aspect of the present invention, in the twenty-second aspect, the initial value of the random number is based on the proper number of each terminal.

According to the twenty-fourth aspect of the present invention, in the twenty-two or twenty-third aspect, the random number is an algebraic function or a transcendental function whose range is from no less than 0 to less than 1.

According to the twenty-fifth aspect of the present invention, in one of the twenty-first to twenty-fourth aspects, the random time is represented by expression (1):

$$\text{Wait}=Tb*RND(\,) \qquad (1)$$

where Wait indicates a period of time from when a terminal finishes the receiving process of the indication signal until the terminal sends the request signal, Tb indicates indication signal interval, and RND( ) indicates a function for producing the random number no less than 0 and less than 1.

According to the twenty-sixth aspect of the present invention, in one of the twenty-first to twenty-fourth aspects, the random time is represented by expression (2):

$$\text{Wait}=(Tb-Tb2)*RND(\,) \qquad (2)$$

where Wait indicates a period of time from when a terminal finishes the receiving process of the indication signal until the terminal sends the request signal, Tb indicates indication signal interval, Tb2 indicates a period of time from when the terminal starts the receiving process of the indication signal until the terminal finishes the process, and RND( ) indicates a function for producing the random number no less than 0 and less than 1.

According to the twenty-seventh aspect of the present invention, in one of the twenty-first to twenty-fourth aspects, the random time is represented by expression (3):

$$\text{Wait}=(Tb-Tb2)*RND0-Td \qquad (3)$$

where Wait indicates a period of time from when a terminal finishes the receiving process of the indication signal until the terminal sends the request signal, Tb indicates indication signal interval, Tb2 indicates a period of time from when the terminal starts the receiving process of the indication signal until the terminal finishes the process, Td indicates the time which it takes for the terminal to receive data from the base station, and RND( ) indicates a function for producing the random number no less than 0 and less than 1.

According to the twenty-eighth aspect of the present invention, in one of the twenty-first to twenty-fourth aspects, the random time is represented by expression (4):

$$\text{Wait}=(Tb-Tb2-Td2)*RND(\,)+Td2-Td \qquad (4)$$

where Wait indicates a period of time from when a terminal finishes the receiving process of the indication signal until the terminal sends the request signal, Tb indicates indication signal interval, Tb2 indicates a period of time from when the terminal starts the receiving process of the indication signal until the terminal finishes the process, Td indicates the time which it takes for the terminal to receive data from the base station, Td2 indicates the predicted time which it takes for another terminal which has acquired a priority to receive data, and RND( ) indicates a function for producing the random number no less than 0 and less than 1.

According to the twenty-ninth aspect of the present invention, in one of the twenty-first to twenty-fourth aspects, the random time is represented by expression (11):

$$\text{Wait}=(Tb-Tb2-Td-Tds*m)*RND(\,)+Td+Tds*m \qquad (11)$$

where Wait indicates a period of time from when a terminal finishes the receiving process of the indication signal until the terminal sends the request signal, Tb indicates indication signal interval, Tb2 indicates a period of time from when the terminal starts the receiving process of the indication signal until the terminal finishes the process, Td indicates the time which it takes for the terminal to receive data from the base station, Tds indicates a generalized value of the predicted time which it takes for other terminals than the terminal to receive data, m indicates a natural number, and RND( ) indicates a function for producing the random number no less than 0 and less than 1.

According to the thirtieth aspect of the present invention, in one of the twentieth to twenty-ninth aspects, when the base station transmits the next indication signal to a terminal while the terminal is receiving data from the base station, the terminal gives priority to the reception of the data, and the base station ignores request signals from other terminals.

In accordance with the present invention, each terminal sends a PS-POLL to an access point to receive data therefrom not on receipt of a beacon from the access point but after a designated time has passed. Therefore, the terminal consumes lower amount of electricity while waiting in standby state to send a PS-POLL.

BRIEF DESCRIPTION OF THE DRAWINGS

The above and further objects and novel features of the invention will be more fully understood from the following detailed description when the same is read in connection with the accompanying drawings in which.

DETAILED DESCRIPTION OF THE PREFERRED EMBODIMENTS

The present invention is characterized in that, in a wireless LAN (IEEE802.11) system as a data transmission-reception system, when an access point (hereinafter referred to as AP) as a base station sends data to a station (hereinafter referred to as STA) as a terminal, the STA consumes lower amount of electricity while in the standby or waiting state.

In the conventional technique, each STA in a wireless LAN sends a PS-POLL as a request signal just after receiving a beacon as an indication signal. However, in the case that there are data to be sent to multiple STAs from the AP, every STA tries to send a PS-POLL at the same time. Thus electricity is wastefully consumed while the STA is in PS-POLL waiting state.

Therefore, the present invention is aimed at avoiding competition among STAs to reduce electricity consumption in PS-POLL waiting state by controlling the timing in which the respective STAs send their PS-POLLs.

In other words, the present invention provides a competition avoidance control method for a data transmission-reception system in which a plurality of STAs are connected to an AP, respectively, wherein each STA avoids competition for priority to receive data within the time after having received a beacon simultaneously with other STAs until receiving the next one, and when each STA sends the AP a PS-POLL to receive data, the STA sends the PS-POLL after a designated time has passed.

Further, according to the present invention, each STA sends a PS-POLL to the AP after an individually different random time has passed.

The random time is produced based on a random number no less than 0 and less than 1 or a pseudo-random number no less than 0 and less than 1.

The initial value of the random number is based on the proper number of each STA. For instance, the proper-number may be set by inputting data, such as STA's production number, a user ID or a password, or a certain combination of them from the outside. In the case where the ID or password contains symbols other than numeric characters, for example, alphabetic characters, the alphabetic characters may be replaced with numeric characters from 0 to 9 as A replaced with 0, B with 1, C with 2, . . . , J with 9, K with 0, L with 1, M with 2, and also/may be replaced with 0, – with 1, * with 2, and @ with 3. Further, in the case that the present invention is applied to a WLAN (wireless LAN), when each STA is connected to the AP, a number from 1 to 2007 is assigned to the STA. The initial value may be obtained by normalizing the number, more specifically, by dividing the value obtained by subtracting 1 from k (each STA number) by 2007.

Figure 3:
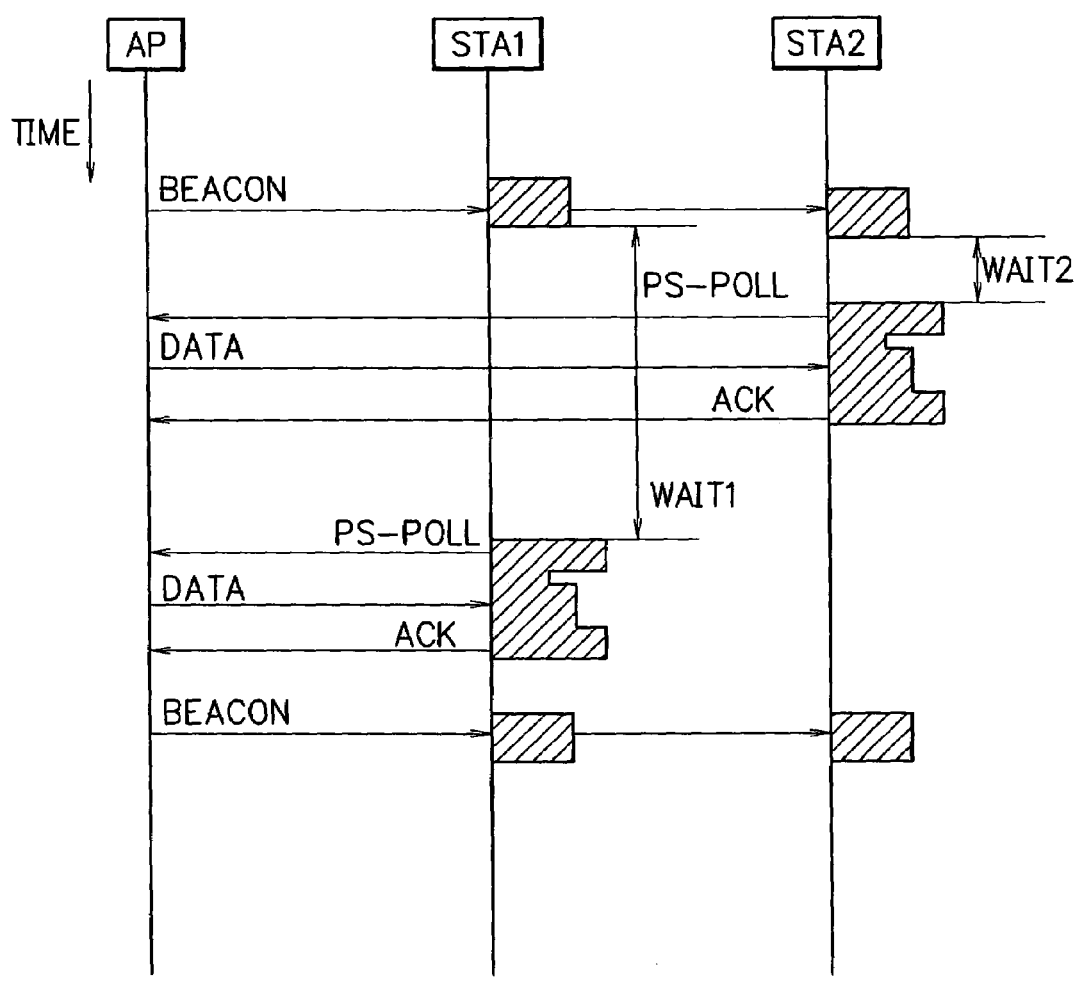
FIG. 3 is a sequence diagram to explain a competition avoidance control method applied to a wireless LAN as a data transmission-reception system in accordance with an embodiment of the present invention.
Figure 4:
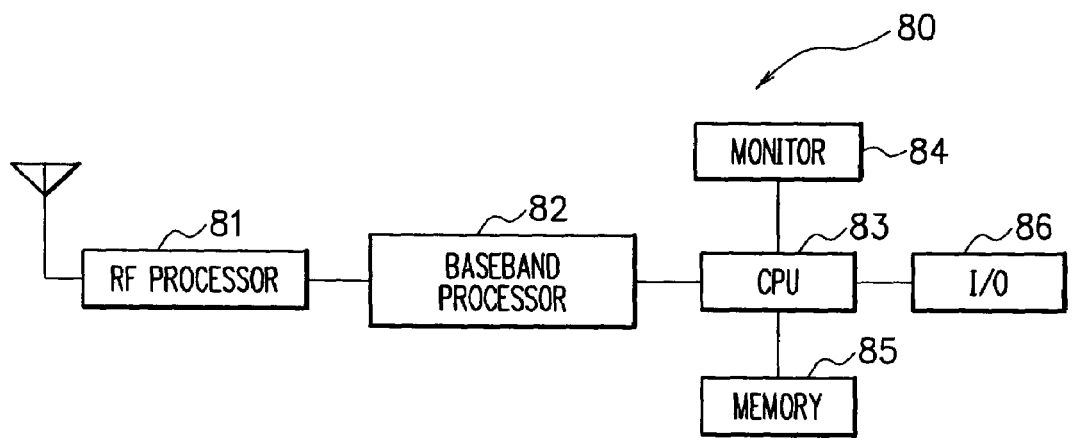
FIG. 4 is a block diagram showing a terminal employing the competition avoidance control method for a data transmission-reception system in accordance with the embodiment of the present invention.
Figure 5:
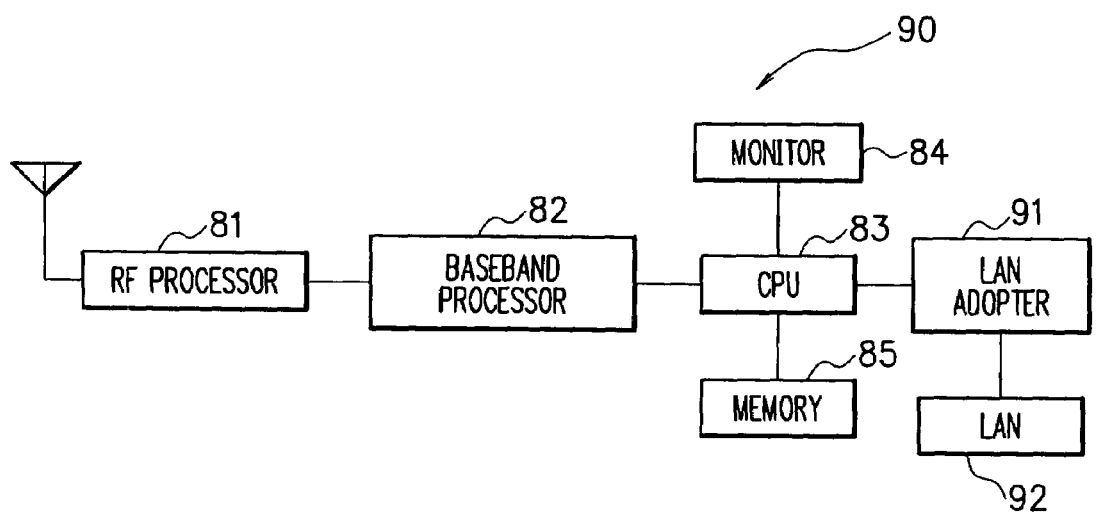
FIG. 5 is a block diagram showing an access point as a base station employing the competition avoidance control method for a data transmission-reception system in accordance with the embodiment of the present invention.

FIG. 3 is a sequence diagram to explain a competition avoidance control method applied to a wireless LAN as a data transmission-reception system according to an embodiment of the present invention. FIG. 4 is a block diagram showing a terminal employing the competition avoidance control method for a data transmission-reception system. FIG. 5 is a block diagram showing an access point as a base station employing the competition avoidance control method for a data transmission-reception system. In FIGS. 4 and 5, like numerals refer to like parts.

Referring to FIG. 4, a terminal (STA) 80 comprises an RF (Radio Frequency) processor 81, a baseband processor 82, a CPU (central processing unit) 83, a monitor 84, a memory 85 and an I/O 86.

The RF processor 81 performs the detection of received radio wave and the like. The baseband processor 82 processes signals, which are in the band of information signals (such as audio, image and digital data) before modulation or after demodulation. The memory 85 includes a RAM (Random Access Memory) and a ROM (Read Only Memory), which are not shown in the diagram. The ROM stores a control program and the like and the RAM stores received information. The monitor 84 displays an operation screen, image information, character information and the like. The CPU 83 controls the respective parts.

Referring to FIG. 5, an access point (AP) 90 comprises an RF processor 81 and a baseband processor 82 which are the same as those of the STA 80 and also a LAN adopter 91.

The LAN adopter 91 connects the AP 90 and each STA 80 (shown in FIG. 4) via a wired LAN 92.

The STA 80 sends a PS-POLL to the AP 90 for receiving data after a designated time has passed. The AP 90 receives a PS-POLL for sending data after a designated time has passed. It is often the case that the respective STAs 80 compete among themselves to send a PS-POLL.

Therefore, the inventor has developed a method of avoiding the competition.

Next, there will be described a competition avoidance control method in a wireless LAN as a data transmission-reception system.

In the competition avoidance control method in a wireless LAN, each STA sends a PS-POLL not just after receiving a beacon but after waiting for a random time. Because the respective STAs wait for a random time, there is a lower probability that the STA 1 and the STA 2 send a PS-POLL at the same timing and compete with each other. Therefore the STAs consume lower amounts of electricity while waiting the time to send a PS-POLL.

In FIG. 3, two STA 1 and STA 2 belongs to one AP. However, the number of the STAs is cited merely by way of example and without limitation. The shaded portion shows the electricity consumption.

The AP sends beacons periodically. The beacon includes an identifier indicating whether or not there is data addressed to each STA. Each STA determines the presence or absence of data from the identifier, and sends a PS-POLL to the AP when the AP has data addressed to the STA. The AP learns by receiving the PS-POLL that the STA is capable of receiving the data, and sends the data addressed to the STA. Having received the data, the STA sends an ACK (acknowledgement) informing the completion of data reception to the AP. During the data reception, as shown by the shaded portion in FIG. 3, electricity is consumed correspondingly to the transmission and reception.

According to the present invention, each STA sends a PS-POLL not just after receiving a beacon but after waiting a designated time. Consequently, PS-POLLs from the respective STAs hardly collide or compete with one another. Therefore, the electricity consumption by the STA waiting to send a PS-POLL can be reduced.

In the following, a description will be given of the operation of a data transmission-reception system according to an embodiment of the present invention.

Figure 6:
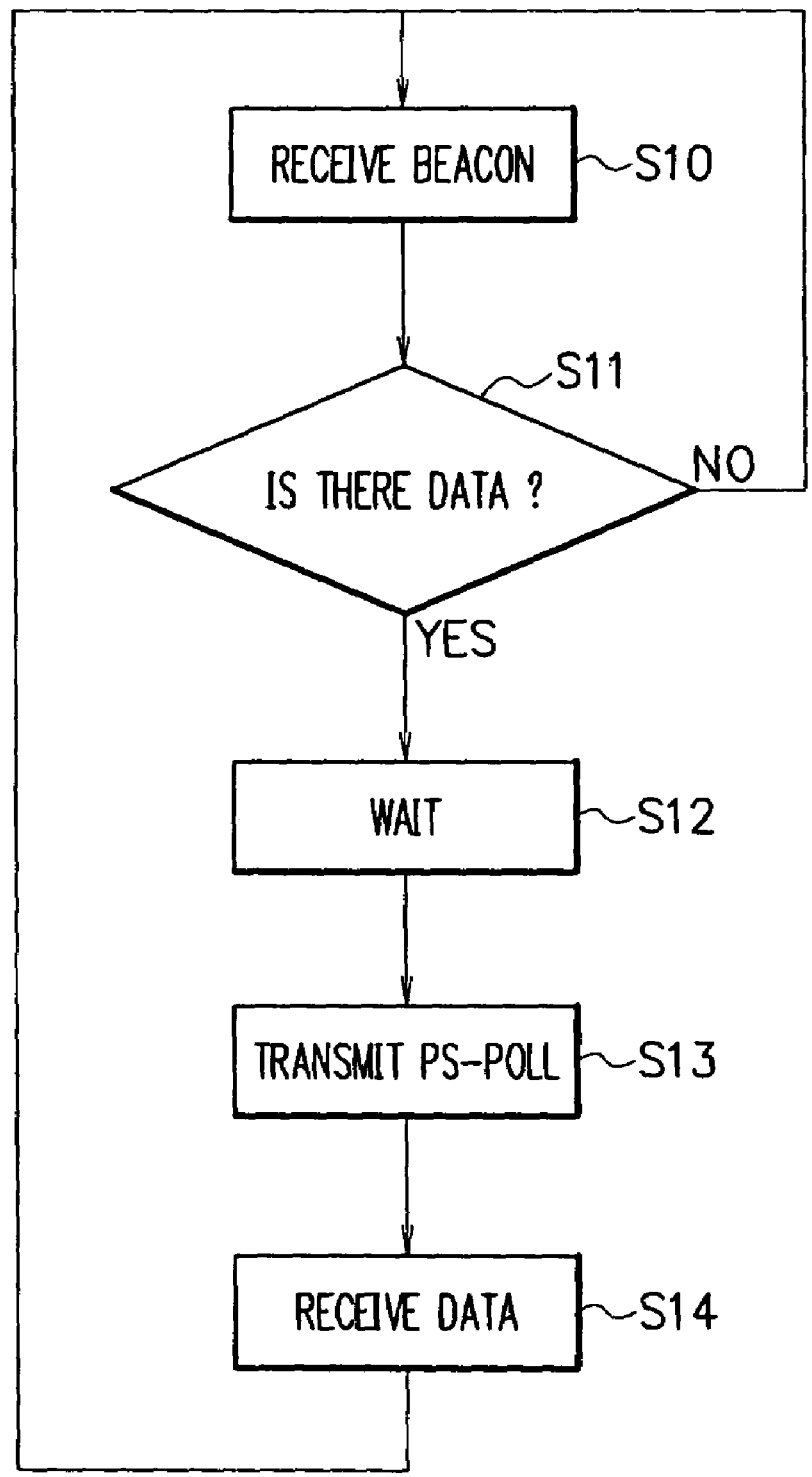
FIG. 6 is a flowchart to explain a method for controlling a wireless LAN employing the competition avoidance control method for a data transmission-reception system in accordance with the present invention.

FIG. 6 is a flowchart showing a method for controlling a wireless LAN employing the competition avoidance control method for a data transmission-reception system in accordance with the embodiment of the present invention.

Figure 7:
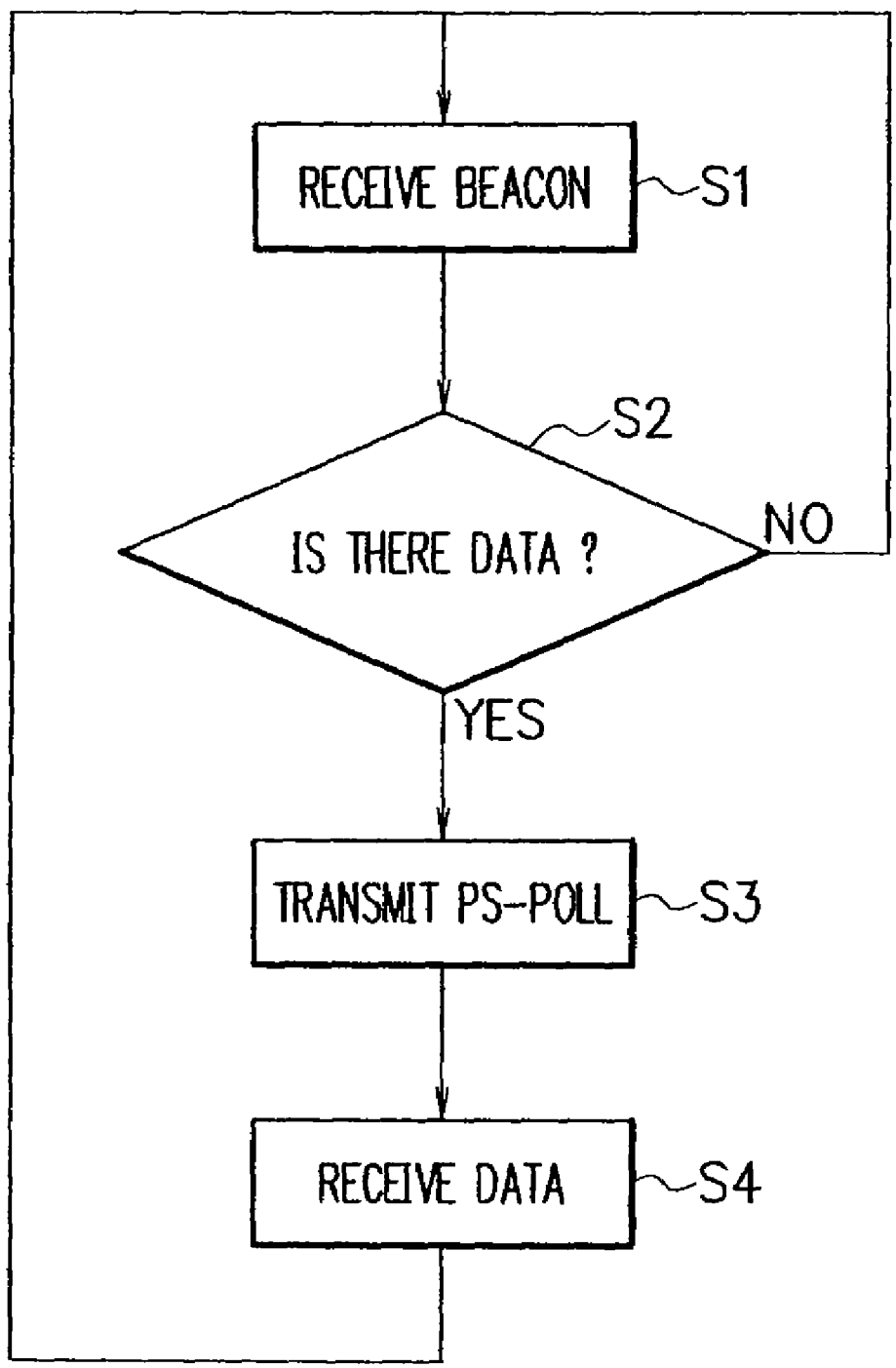
FIG. 7 is a flowchart to explain a conventional method for controlling a wireless LAN.

FIG. 7 is a flowchart showing a conventional method for controlling a wireless LAN.

Incidentally, a number k (an integer: one or more) is assigned to each STA. First, each STA receives a beacon (step S1).

Next, the STA analyzes the contents of the beacon and determines the presence or absence of data addressed to the STA (step S2).

Having determined that the AP has no data addressed to the STA (step S2, No), the STA waits for the reception of the next beacon (step S1).

Having determined that there is the data (step S2, Yes), the STA sends a PS-POLL to inform the AP that the STA is capable of receiving the data (step S3), and receives the data (step S4).

Figure 1:
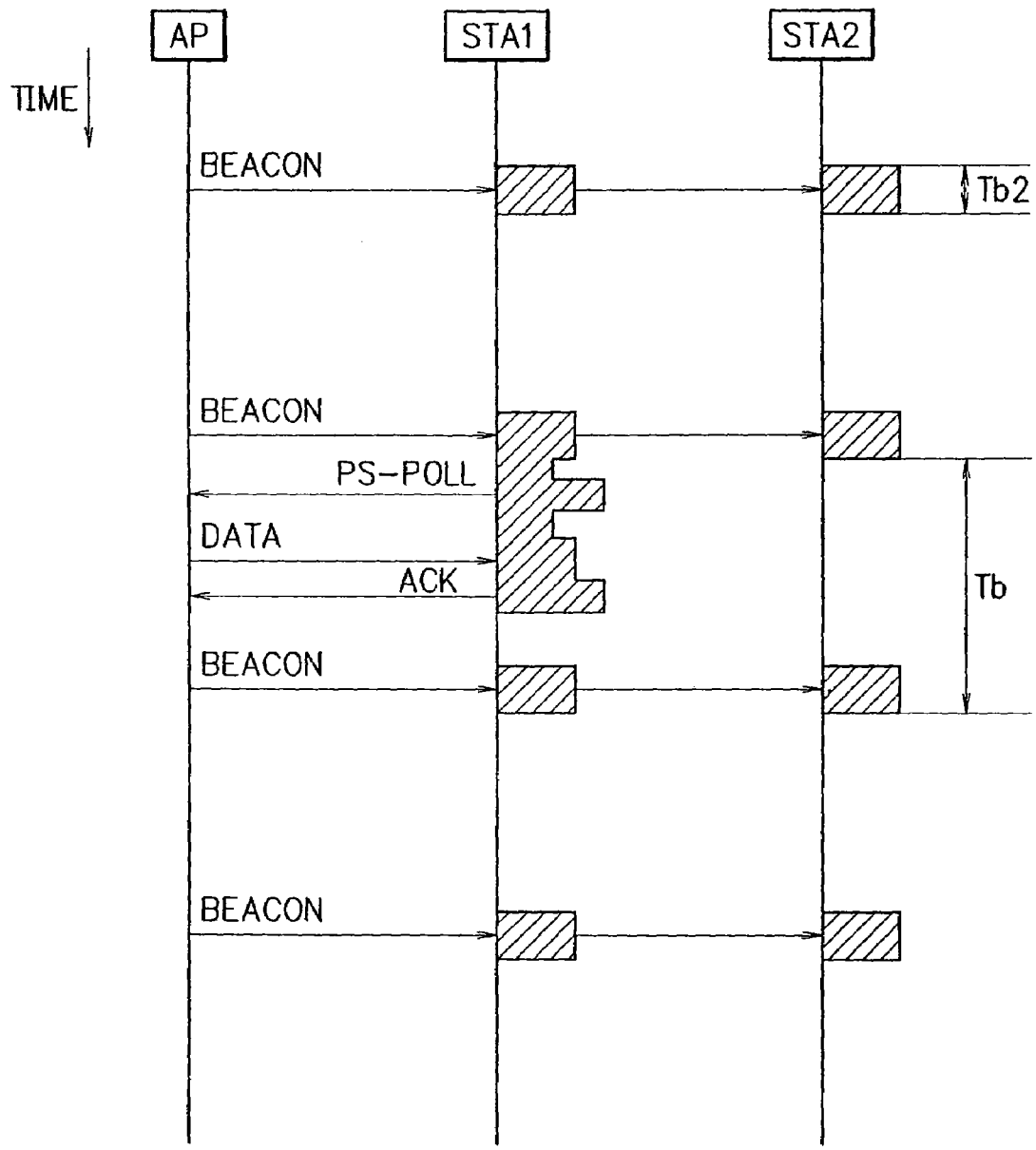
FIG. 1 is a sequence diagram to explain a conventional method for controlling a wireless LAN as a conventional transmission-reception system.
Figure 2:
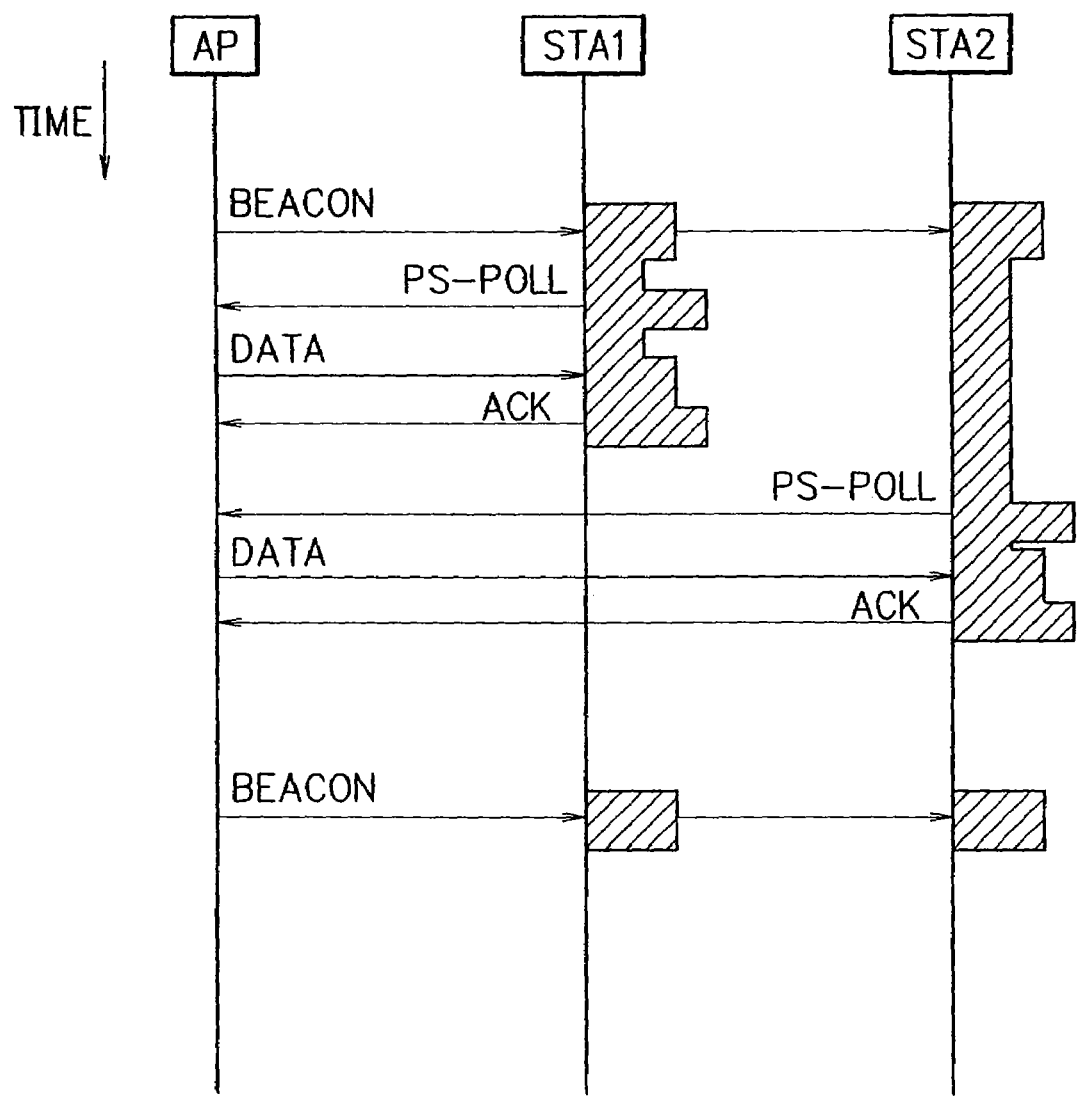
FIG. 2 is a sequence diagram to explain the conventional method for controlling a wireless LAN for a plurality of terminals.

The conventional STA, as shown in FIG. 7, sends a PS-POLL just after determining the presence or absence of data (step S2). Therefore, as shown in FIG. 2, when there are data for plural STAs, the STAs try to send their respective PS-POLLs at the same time (step S3). The STA 1 which acquires a priority, sends the PS-POLL immediately and finishes the process.

On the contrary, the STA 2 which has failed to acquire a priority is to acquire a priority after the data receiving process of the STA 1 has finished. The STA 2 is always prepared to send a PS-POLL while in wait state because the waiting time before sending the PS-POLL is not clear. Accordingly, the STA 2 consumes electricity corresponding to the waiting time.

In the present invention, as shown in FIG. 6, the STA 1 and the STA 2 wait for a random time after determining the presence or absence of data in the minimum required state to reboot without monitoring the radio wave conditions or preparing for transmission (step S12).

As above, by providing the random waiting time to each STA, each STA sends a PS-POLL at random timing as shown in FIG. 3. Therefore, less PS-POLLs of the STAs collide with one another. In addition, the STA waits less time to send a PS-POLL, thus consuming lower amount of electricity.

As an example, the waiting time before sending a PS-POLL is represented by expression (3):

$$\text{Wait} = (Tb - Tb2) * RND(\ ) - Td \qquad (3)$$

where, Wait indicates a period of time from when the STA finishes the receiving process of a beacon until the STA sends the PS-POLL, Tb indicates beacon interval, Tb2 indicates a period of time from when the STA starts the receiving process of the beacon until the STA finishes it, Td indicates the time which it takes for the STA to receive data from the AP, and RND( ) indicates a function for producing a random number no less than 0 and less than 1.

In expression (3), Td is the predicted data receiving time of the STA. The predicted data receiving time means, for instance, the time decided by the data length and transfer rate of packets used for data transmission-reception, and it varies depending on the type of the upper applications (audio data used for VoIP, image data used for Web and the like). Further, Tb2 is subtracted from Tb so that the timing of PS-POLL transmission does not overlap with the next beacon processing. According to Td, the host CPU controlling a wireless LAN is able to figure out the type of data being currently transmitted. Therefore, it is also possible to estimate the amount of data according to a mathematical statistical method (frequency distribution, central value, etc., reference is mode to, for instance, "New Encyclopedia of Mathematics (Shin Sugaku-Jiten)" by Shin Hitotsumatsu et. al. Osaka shoseki co., ltd., pp 633-636, Mar. 30, 1998.

In the case of using the frequency distribution, the range of the amount of data with the maximum frequency (class value) shown in a frequency distribution table with the vertical axis representing the frequency and the horizontal axis representing the amount of data may be used. In the case of using the central value, the value with the maximum amount of data (mode value) or the average value shown in the frequency distribution table with the vertical axis showing the frequency and the horizontal axis showing the amount of data may be used.

By subtracting a beacon time (a period of time from when the STA starts the receiving process of a beacon or an indication signal until the STA finishes it), the timing of PS-POLL transmission hardly coincides with the next beacon processing. Therefore, the electricity consumption can be reduced.

Here, for RND( ) as a random number, a new function whose range is from no less than 0 to less than 1 may be employed. Examples of the function include an algebraic function such as a direct function, a quadratic function and a nth-degree function, and transcendental functions such as an irrational function, a trigonometric function, an index function and a logarithmic function. In this case, uneven distribution of the random number may occur without a problem because it is also possible to avoid the competition for PS-POLLs.

For instance, RND( ) can be expressed by the following expressions.

$$RND(\ )=p/10^n \qquad (5)$$

where p indicates a random number of n digits read out from a random number table (not shown), and n indicates the digit number of the random number.

Here, the random number table is stored in the memory of each STA, and the CPU reads it out of the memory.

$$RND(\ )=|\sin\theta| \qquad (6)$$

where, $\theta$ indicates a random number except $\pi/2+2p\pi$ (radian), and p indicates an integer.

$$RND(\ )=|\cos\theta| \qquad (7)$$

where, $\theta$ indicates a random number except $2q\pi$ (radian), and q indicates an integer.

The initial value of RND( ) is supposed to be different for the respective STAs. If the same initial value of RND( ) is used for all the STAs, the STAs compete with one another to send their PS-POLLs. Further, RND( ) may be a pseudo-random number, for instance, a number selected from an arbitrary sequence of numbers. The initial value of RND( ) can be set to be different for the respective STAs based on the propre numbers of the STAs.

$$RND(\ )=e^{-x} \qquad (8)$$

where x indicates a random number no less than 0.

$$RND(\ )=\log x \qquad (9)$$

where x indicates a random number no less than 1 and less than e (the base of the natural logarithms: 2.718281 . . . ).

$$RND(\ )=|x| \qquad (10)$$

where x indicates a random number no less than 0 and less than 1.

Incidentally, RND( ) can also be expressed by a combination of two or more of expressions (5) to (10), or a combination of two or more of expressions (4) to (10).

As set forth hereinabove, in accordance with the embodiment of the present invention, because the STAs wait before sending their respective PS-POLLs, the PS-POLLs hardly collide with one another, and waiting time (preparing time) before sending the PS-POLL is reduced. Therefore, the electricity consumption can be reduced.

In the following, a description will be given of the operation of a data transmission-reception system according to another embodiment of the present invention.

Figure 8:
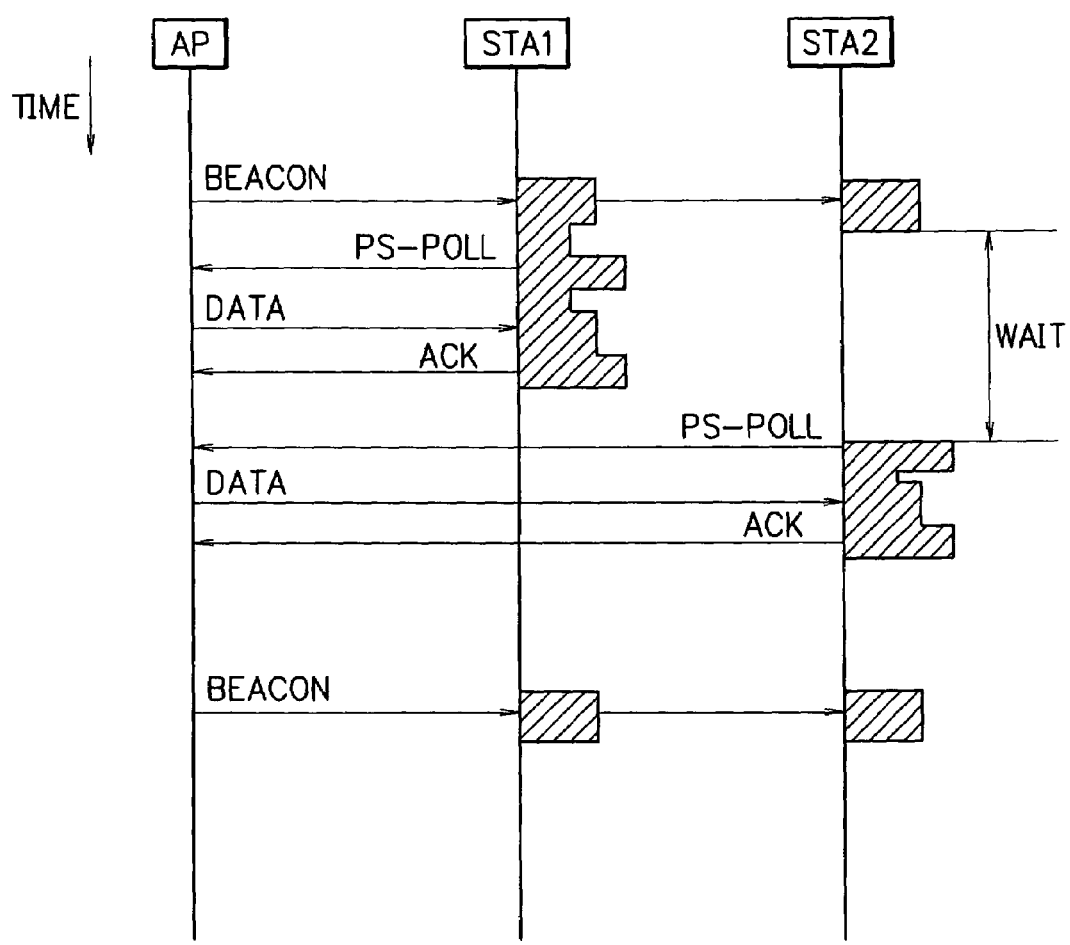
FIG. 8 is a sequence diagram to explain a competition avoidance control method for a data transmission-reception system in accordance with another embodiment of the present invention.

FIG. 8 is a sequence diagram showing a competition avoidance control method for a data transmission-reception system according to the other embodiment of the present invention.

Figure 9:
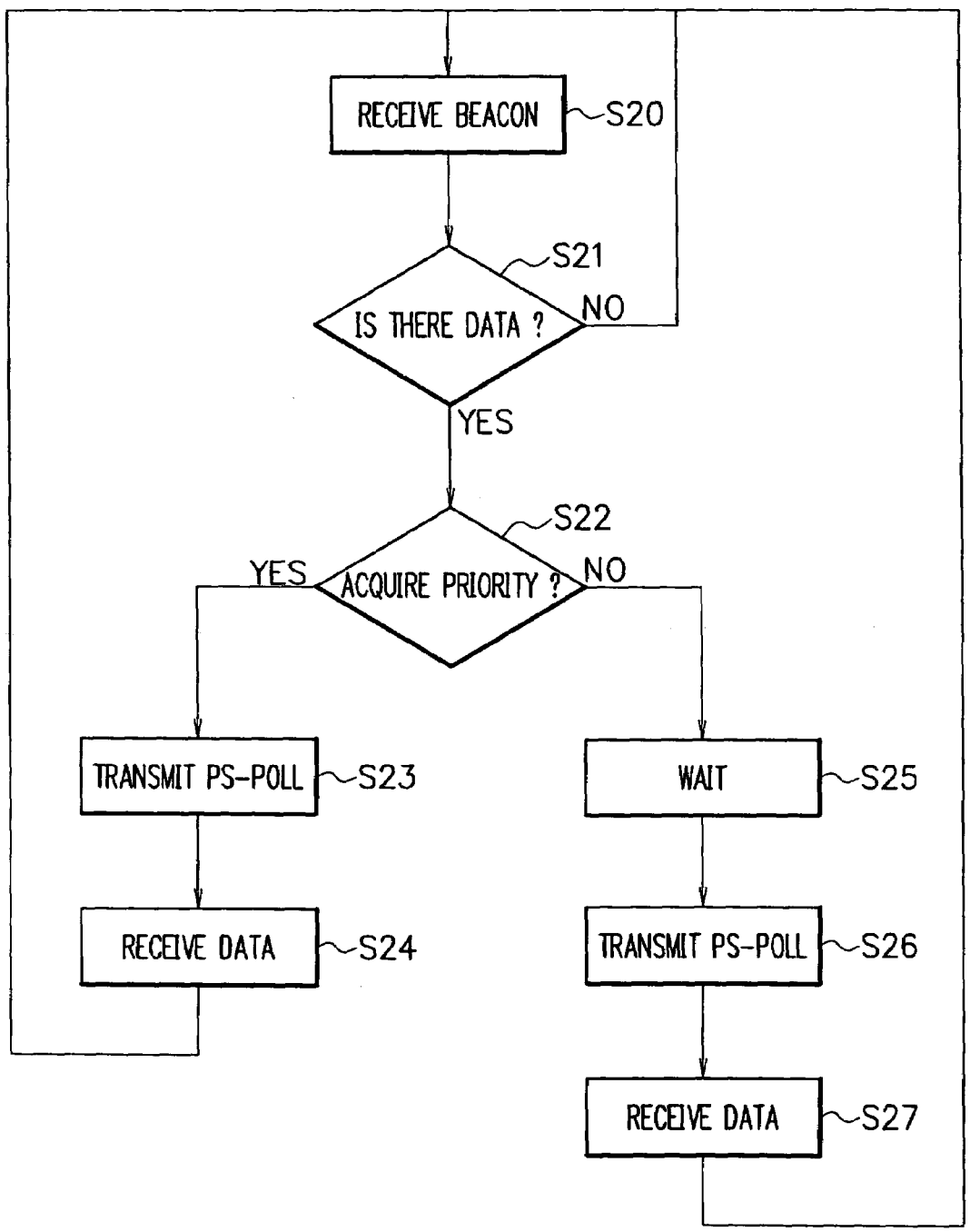
FIG. 9 is a flowchart to explain the competition avoidance control method for a data transmission-reception system in accordance with another embodiment example of the present invention.

FIG. 9 is a flowchart showing the competition avoidance control method for a data transmission-reception system according to the other embodiment of the present invention.

Each STA (1, 2) receives a beacon (step S20), and determines the presence or absence of data addressed to the STA (step 21).

The STA (1, 2) determines whether or not it has acquired a priority (step S22). When having acquired a priority (step S22, Yes), the STA (1, 2) sends a PS-POLL without waiting (step S23) as is conventionally done, and receives the data (step S24). When having failed to acquire a priority (step S22, No), the STA (1, 2) waits for a designated time to send a PS-POLL (step S25). After the waiting time has passed, the STA (1, 2) sends the PS-POLL (step S26), and receives the data (step S27). While waiting before sending the PS-POLL, the STA (1, 2) is in standby state, thus consuming lower amounts of electricity.

In FIG. 8, STA 1 acquires a priority, and STA 2 is waiting before sending a PS-POLL.

The waiting time, Wait, before sending a PS-POLL is represented by expression (4):

$$\text{Wait}=(Tb-Tb2-Td2)*RND(\ )+Td2-Td \qquad (4)$$

where Wait indicates a period of time from when the STA finishes the receiving process of the beacon until the STA sends the PS-POLL, Tb indicates beacon interval, Tb2 indicates a period of time from when the STA starts the receiving process of the beacon until the STA finishes it, Td indicates the time which it takes for the STA to receive the data from the AP, Td2 indicates the predicted time which it takes for another STA which has acquired a priority, and RND( ) indicates a function for producing a random number no less than 0 and less than 1.

In this construction, one STA sends a PS-POLL just after receiving a beacon. Another STA sends a PS-POLL after the data receiving process of the STA. Thus there is lower probability of the PS-POLLs colliding with one another. Therefore, according to this embodiment, the electricity consumption can be more efficiently reduced.

In these embodiments, expressions (2) and (3) are used to obtain Wait, the waiting time before the STA sends a PS-POLL, by way of example and without limitation. Wait can be expressed by expression (1) or (2).

$$\text{Wait}=Tb*RND(\ ) \qquad (1)$$

where Wait indicates a period of time from when the STA finishes the receiving process of the beacon until the STA sends the PS-POLL, Tb indicates beacon interval, and RND( ) indicates a function for producing a random number no less than 0 and less than 1.

Wait, the waiting time, expressed by expression (1) may overlap with the beacon transmission time of the AP. When the both overlap, the STA may stand by again to send a PS-POLL. In this case, the electricity consumption can also be reduced.

$$\text{Wait}=(Tb-Tb2)*RND(\ ) \qquad (2)$$

where Wait indicates a period of time from when the STA finishes the receiving process of the beacon until the STA sends the PS-POLL, Tb indicates beacon interval, Tb2 indicates a period of time from when the STA starts the receiving process of the beacon until the STA finishes it, and RND( ) indicates a function for producing a random number no less than 0 and less than 1.

Further, Wait, the waiting time, can be expressed by the expression (ii):

$$\text{Wait}=(Tb-Tb2-Td-Tds*m)*RND(\ )+Td+Tds*m \quad (11)$$

where Wait indicates a period of time from when the STA finishes the receiving process of the beacon until the STA sends the PS-POLL, Tb indicates beacon interval, Tb2 indicates a period of time from when the STA starts the receiving process of the beacon until the STA finishes it, Tds indicates a generalized value of the predicted time which it takes for other terminals than the terminal to receive data, m indicates a natural number, and RND( ) indicates a function for producing a random number no less than 0 and less than 1.

In this case also, the competition for the transmission of PS-POLLs can be avoided and the electricity consumption can be reduced.

In addition, the STA which has failed to acquire a priority at the first time, enters into waiting state immediately after learning that the priority has been acquired by another STA without monitoring the radio wave condition, and sends a PS-POLL after waiting for the time expressed by expression (12):

$$\text{Wait}=(Tb-Tb2-Td-Tds)*RND(\ )+Td+Tds \quad (12)$$

If the STA has failed to acquire a priority when sending the first PS-POLL, the mth waiting time for sending a PS-POLL is expressed by expression (11) as described above. Thus, the STA can send a PS-POLL any number of times by applying expression (11).

Incidentally, while, in the embodiments described above, RND( ) is used as a random number for calculating the Wait, $\{RND(\ )\}^k$, $\{RND(\ )\}/k$, or $\{RND(\ )\}^{1/k}$ can be used singularly or in combination instead of $\{RND(\ )\}$. In this case, as the same way, the competition for the transmission of PS-POLLs can be avoided and the electricity consumption can be reduced.

While, in the embodiments described above, the present invention is applied to a wireless LAN, it is not to be restricted by the embodiments. The present invention can also be applied to a wired transmission-reception system, and also to a terminal or a base station for a data transmission-reception system.

While preferred embodiments of the invention have been described using specific terms, the description has been for illustrative purpose only, and it is to be understood that changes and variations may be made without departing from the spirit or scope of the following claims.

What is claimed is:

1. A data transmission-reception system comprising a base station and a plurality of terminals connected to the base station, respectively, wherein:
   each of the terminals receives data from the base station upon having acquired priority from the base station during an indication signal interval, which is a period of time starting from when the terminals simultaneously receive an indication signal until the terminals receive a next indication signal, said terminals waiting in standby mode when having failed to acquire priority; and
   each terminal sends a request signal to the base station after a waiting time has passed from when that terminal has received the indication signal, said waiting time having a length that is a function of the indication signal interval and of a random number generating function, wherein said waiting time constitutes a random time, unique to each terminal, that has passed from when that terminal received the indication signal, and wherein the random time is represented by expression (2):

$$\text{Wait}=(Tb-Tb2)*RND(\ ) \quad (2)$$

where Wait indicates a period of time from when the terminal finishes the receiving process of the indication signal until the terminal sends the request signal, Tb indicates the indication signal interval, Tb2 indicates a period of time from when the terminal starts the receiving process of the indication signal until the terminal finishes the process, and RND( ) indicates a function for producing the random number no less than 0 and less than 1.

2. A data transmission-reception system comprising a base station and a plurality of terminals connected to the base station, respectively, wherein:
   each of the terminals receives data from the base station upon having acquired priority from the base station during an indication signal interval, which is a period of time starting from when the terminals simultaneously receive an indication signal until the terminals receive a next indication signal, said terminals waiting in standby mode when having failed to acquire priority; and
   each terminal sends a request signal to the base station after a waiting time has passed from when that terminal has received the indication signal, said waiting time having a length that is a function of the indication signal interval and of a random number generating function, wherein said waiting time constitutes a random time, unique to each terminal, that has passed from when that terminal received the indication signal, and wherein the random time is represented by expression (3):

$$\text{Wait}=(Tb-Tb2)*RND(\ )-Td \quad (3)$$

where Wait indicates a period of time from when the terminal finishes the receiving process of the indication signal until the terminal sends the request signal, Tb indicates the indication signal interval, Tb2 indicates a period of time from when the terminal starts the receiving process of the indication signal until the terminal finishes the process, Td indicates the time which it takes for the terminal to receive data from the base station, and RND( ) indicates a function for producing the random number no less than 0 and less than 1.

3. A data transmission-reception system comprising a base station and a plurality of terminals connected to the base station, respectively, wherein:
   each of the terminals receives data from the base station upon having acquired priority from the base station during an indication signal interval, which is a period of time starting from when the terminals simultaneously receive an indication signal until the terminals receive a next indication signal, said terminals waiting in standby mode when having failed to acquire priority; and
   each terminal sends a request signal to the base station after a waiting time has passed from when that terminal has received the indication signal, said waiting time having a length that is a function of the indication signal interval and of a random number generating function, wherein said waiting time constitutes a random time, unique to each terminal, that has passed from when that terminal received the indication signal, and wherein the random time is represented by expression (4):

$$\text{Wait}=(Tb-Tb2-Td2)*RND(\ )+Td2-Td \quad (4)$$

where Wait indicates a period of time from when the terminal finishes the receiving process of the indication signal until the terminal sends the request signal, Tb indicates the indication signal interval, Tb2 indicates a period of time from when the terminal starts the receiving process of the indication signal until the terminal finishes the process, Td indicates the time which it takes for the terminal to receive data from the base station, Td2 indicates the predicted time which it takes for another terminal which has acquired priority to receive data, and RND( ) indicates a function for producing the random number no less than 0 and less than 1.

4. A terminal for a data transmission-reception system comprising a base station, the terminal connected to the base station, and a plurality of other terminals connected to the base station, respectively, the terminal receiving data from the base station upon having acquired priority from the base station during an indication signal interval, which is a period of time starting from when the terminal and the other terminals simultaneously receive an indication signal until the terminal and the other terminals receive a next indication signal, and the terminal waiting in standby mode when having failed to acquire priority, wherein the terminal sends a request signal to the base station to receive data therefrom after a waiting time has passed from when the terminal received the indication signal, said waiting time having a length that is a function of the indication signal interval and of a random number generating function, wherein said waiting time constitutes a random time, unique to the terminal, that has passed from when the terminal received the indication signal, and wherein the random time is represented by expression (2):

$$\text{Wait}=(Tb-Tb2)*RND(\ ) \qquad (2)$$

where Wait indicates a period of time from when the terminal finishes the receiving process of the indication signal until the terminal sends the request signal, Tb indicates the indication signal interval, Tb2 indicates a period of time from when the terminal starts the receiving process of the indication signal until the terminal finishes the process, and RND( ) indicates a function for producing the random number no less than 0 and less than 1.

5. A terminal for a data transmission-reception system comprising a base station, the terminal connected to the base station, and a plurality of other terminals connected to the base station, respectively, the terminal receiving data from the base station upon having acquired priority from the base station during an indication signal interval, which is a period of time starting from when the terminal and the other terminals simultaneously receive an indication signal until the terminal and the other terminals receive a next indication signal, and the terminal waiting in standby mode when having failed to acquire priority, wherein the terminal sends a request signal to the base station to receive data therefrom after a waiting time has passed from when the terminal received the indication signal, said waiting time having a length that is a function of the indication signal interval and of a random number generating function, wherein said waiting time constitutes a random time, unique to the terminal, that has passed from when the terminal received the indication signal, and wherein the random time is represented by expression (3):

$$\text{Wait}=(Tb-Tb2)*RND(\ )-Td \qquad (3)$$

where Wait indicates a period of time from when the terminal finishes the receiving process of the indication signal until the terminal sends the request signal, Tb indicates the indication signal interval, Tb2 indicates a period of time from when the terminal starts the receiving process of the indication signal until the terminal finishes the process, Td indicates the time which it takes for the terminal to receive data from the base station, and RND( ) indicates a function for producing the random number no less than 0 and less than 1.

6. A terminal for a data transmission-reception system comprising a base station, the terminal connected to the base station, and a plurality of other terminals connected to the base station, respectively, the terminal receiving data from the base station upon having acquired priority from the base station during an indication signal interval, which is a period of time starting from when the terminal and the other terminals simultaneously receive an indication signal until the terminal and the other terminals receive a next indication signal, and the terminal waiting in standby mode when having failed to acquire priority, wherein the terminal sends a request signal to the base station to receive data therefrom after a waiting time has passed from when the terminal received the indication signal, said waiting time having a length that is a function of the indication signal interval and of a random number generating function, wherein said waiting time constitutes a random time, unique to the terminal, that has passed from when the terminal received the indication signal, and wherein the random time is represented by expression (4):

$$\text{Wait}=(Tb-Tb2-Td2)*RND(\ )+Td2-Td \qquad (4)$$

where Wait indicates a period of time from when the terminal finishes the receiving process of the indication signal until the terminal sends the request signal, Tb indicates the indication signal interval, Tb2 indicates a period of time from when the terminal starts the receiving process of the indication signal until the terminal finishes the process, Td indicates the time which it takes for the terminal to receive data from the base station, Td2 indicates the predicted time which it takes for one of the other terminals which has acquired priority to receive data, and RND( ) indicates a function for producing the random number no less than 0 and less than 1.

7. A terminal for a data transmission-reception system comprising a base station, the terminal connected to the base station, and a plurality of other terminals connected to the base station, respectively, the terminal receiving data from the base station upon having acquired priority from the base station during an indication signal interval, which is a period of time starting from when the terminal and the other terminals simultaneously receive an indication signal until the terminal and the other terminals receive a next indication signal, and the terminal waiting in standby mode when having failed to acquire priority, wherein the terminal sends a request signal to the base station to receive data therefrom after a waiting time has passed from when the terminal received the indication signal, said waiting time having a length that is a function of the indication signal interval and of a random number generating function, wherein said waiting time constitutes a random time, unique to the terminal, that has passed from when the terminal received the indication signal, and wherein the random time is represented by expression (11):

$$\text{Wait}=(Tb-Tb2-Td-Tds*m)*RND(\ )+Td+Tds*m \qquad (11)$$

where Wait indicates a period of time from when the terminal finishes the receiving process of the indication signal until the terminal sends the request signal, Tb indicates indication signal interval, Tb2 indicates a period of time from when the terminal starts the receiving process of the indication signal until the terminal finishes the process, Td indicates the time which it takes for the terminal to receive data from the base station, Tds indicates a generalized value of the predicted time which it takes for the other terminals to receive data, m indicates a natural number, and RND( ) indicates a function for producing the random number no less than 0 and less than 1.

* * * * *